United States Patent [19]
Raghavan et al.

[11] Patent Number: 6,128,500
[45] Date of Patent: *Oct. 3, 2000

[54] METHOD AND SYSTEM TO OPTIMIZE CAPACITY OF A CDMA CELLULAR COMMUNICATION SYSTEM

[75] Inventors: Subramanian Raghavan; Subramanian Vasudevan, both of Louisville; Jennifer Sanchez, Nederland, all of Colo.; Steve Y. Chiu, Bedford, Mass.; Victoria L. C. Okeson, Arvada, Colo.

[73] Assignee: US West, Inc., Denver, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/994,060

[22] Filed: Dec. 19, 1997

[51] Int. Cl.[7] .................................................. H04Q 7/20

[52] U.S. Cl. .......................... 455/453; 455/422; 370/335

[58] Field of Search ..................... 455/422, 423, 455/453, 446; 370/328, 335, 342, 468

[56] References Cited

U.S. PATENT DOCUMENTS

| | | | |
|---|---|---|---|
| 4,573,206 | 2/1986 | Grauel et al. | 455/33 |
| 5,418,843 | 5/1995 | Stjernholm | 379/112 |
| 5,465,390 | 11/1995 | Cohen | 455/33.4 |
| 5,504,937 | 4/1996 | Kangas | 455/33 |
| 5,548,812 | 8/1996 | Padovani et al. | 455/33.2 |
| 5,561,841 | 10/1996 | Markus | 455/33.1 |
| 5,666,356 | 9/1997 | Fleming et al. | 370/328 |
| 5,828,962 | 10/1998 | Ho-A-Chuck | 455/446 |
| 5,859,838 | 1/1999 | Soliman | 370/249 |
| 5,966,661 | 10/1999 | Bernardin et al. | 455/446 |
| 5,983,106 | 11/1999 | Bernardin et al. | 455/446 |
| 6,014,567 | 1/2000 | Budka | 455/453 |
| 6,055,433 | 4/2000 | Yuan et al. | 455/453 |
| 6,061,339 | 5/2000 | Nieczyporowicz et al. | 370/335 |
| 6,069,871 | 5/2000 | Sharma et al. | 370/209 |

OTHER PUBLICATIONS

Howard H. Xia, et al.; "System Design Aspects Of CDMA Personal Communications Services"; IEEE; 1996; pp. 1647–1651.

Stephen V. Hanly; "An Algorithm For Combined Cell–Site Selection And Power To Maximize Cellular Spread Spectrum Capacity"; IEEE; 1995; pp. 1332–1340.

Roy D. Yates, et al; "Integrated Power Control and Base Station Assignment"; IEEE; pp. 638–644.

Jorge A. Ulloa, et al; "An Expert System Approach for Cellular CDMA"; IEEE; 1995; pp. 146–154; vol. 44, No. 3.

Ki–Hong Kim, et al; "Development of the CDMA System Performance Analysis Tool (CDAT)"; IEEE; 1996; pp. 1400–1403.

Ching Yao Huang, et al; "Call Admission in Power Controlled CDMA Systems"; IEEE; 1996; pp. 1665–1669.

Chang Soon Kang, et al; "CDMA Mobile Communication System Performance Analysis Tools for Network Parameter Planning"; IEEE; 1996; pp. 894–898.

*Primary Examiner*—Dwayne D. Bost
*Assistant Examiner*—Joy K. Redmon
*Attorney, Agent, or Firm*—Brooks & Kushman

[57] ABSTRACT

A method and system for optimizing system capacity and allocation in a CDMA cellular communication system obtains a current call volume and associated call characteristics for each of a plurality of cell sites in the system, and estimates effective boundaries for each of the plurality of cell sites to minimize the weighted sum of powers received at selected base stations. Selection of base stations can include highly loaded sites and adjoining cell sites. System parameters are then controlled to effect the estimated cell site boundaries. Thus, the present invention allows for dynamic shrinking and enlarging of cell boundaries to enhance the system capacity advantages of CDMA while maintaining contiguous coverage and avoiding coverage holes.

22 Claims, 7 Drawing Sheets

METHOD AND SYSTEM TO OPTIMIZE CAPACITY OF A CDMA CELLULAR COMMUNICATION SYSTEM

TECHNICAL FIELD

This invention relates to a method and system for optimizing capacity of a CDMA (code division multiple access) cellular communication system.

BACKGROUND ART

In general, a conventional cellular communication system employs numerous cell sites each having a rigidly fixed geographical boundary. Normally, each cell site is capable of transmitting all calls to and from its boundary area. However, occasionally a given cell site is overloaded with a high volume of calls thus creating a temporary "hot spot". The high call volume overloads transmission capacity and, thereby, causes calls to and from the hot spot to be blocked. Often, while one cell site is experiencing an overload, other adjacent cell sites are idle or experiencing a light call volume. When this situation occurs, the utilization, throughput, and capacity of the system are inefficiently used.

One way to improve cellular system utilization, throughput and capacity is to employ the spread spectrum advantages and reuse capabilities of CDMA (code division multiple access). CDMA employs universal frequency reuse, and therefore the capacity of a cell in such a system is directly related to the amount of interference emanating from within and around the cell. Thus, any reduction in interference in a CDMA system results in increased system capacity.

For example, a cell site can support more users within its nominal coverage areas when the cells surrounding it are lightly loaded, i.e., have few operative users, since the interference at this cell site will be reduced. Such a redistribution of capacity is automatic and does not require intervention by a system operator.

However, the trade-off of such automatic redistribution is the fact that the effective coverage radius of a heavily loaded cell is dramatically reduced and can depart significantly from its nominal coverage radius. This creates regions known as coverage holes where users can not access the CDMA system.

Another problem with current CDMA systems is that nominal coverage area is typically fixed and achieves efficient assignment of users to base stations only in situations where the load is uniformly distributed. When call volumes have uneven spatial distributions, user assignments based on fixed nominal coverage areas are inefficient in the sense that users are required to transmit more power than they would otherwise be required under a different assignment. This results in an increase in interference levels and thereby a loss of capacity at cell sites.

Finally, while increasing nominal coverage areas of all cells can mitigate the aforementioned problem of breaks in coverage areas and inefficient user assignment, there is a large capacity penalty that must be paid as a result of the corresponding increase in overlaps (soft handoff regions) between cells. Such a condition places a large fraction of system users in handoff necessitating the allocation of two traffic channels per user as opposed to a single channel.

SUMMARY OF THE INVENTION

Accordingly, an object of the present invention is to provide a method and system which optimizes capacity of a CDMA cellular communications system while overcoming the above-noted problems with respect to contiguous coverage.

Another object of the present invention is to provide a method and system to supply contiguous call coverage in a CDMA cellular communications system without increasing interference levels.

Another object of the present invention is to provide a method and system to support an increased call load in a CDMA cellular communication system without increasing interference levels.

A more specific object of the present invention is to provide a method and system to fill coverage holes, relieve congestion at hot spots, and redistribute call load in a CDMA cellular communications system in order to optimize cell site usage.

Another more specific object of the present invention is to provide a method and system to redistribute call load so as to minimize the weighted sum of the powers received at an operator-defined set of base stations. Such base stations would be typically regions of high load, located adjacent to each other, and exhibit a high degree of interference coupling.

In accordance with the present invention, a method and system are provided for further optimization of system capacity and allocation in a CDMA cellular communication system by minimizing the weighted sum of powers received at selected base stations. The method and system of the present invention include obtaining a current call volume for each of a plurality of cell sites, estimating effective boundaries for each of the plurality of cell sites which minimize the weighted sum of powers received at selected base stations, and controlling system parameters so as to effect the estimated cell site boundaries.

The above objects and other objects, features, and advantages of the present invention will be readily apparent from the following detailed description of the best mode for carrying out the invention when taken in conjunction with the accompanying drawings.

BEST MODE FOR CARRYING OUT THE PRESENT INVENTION

Figure 1:
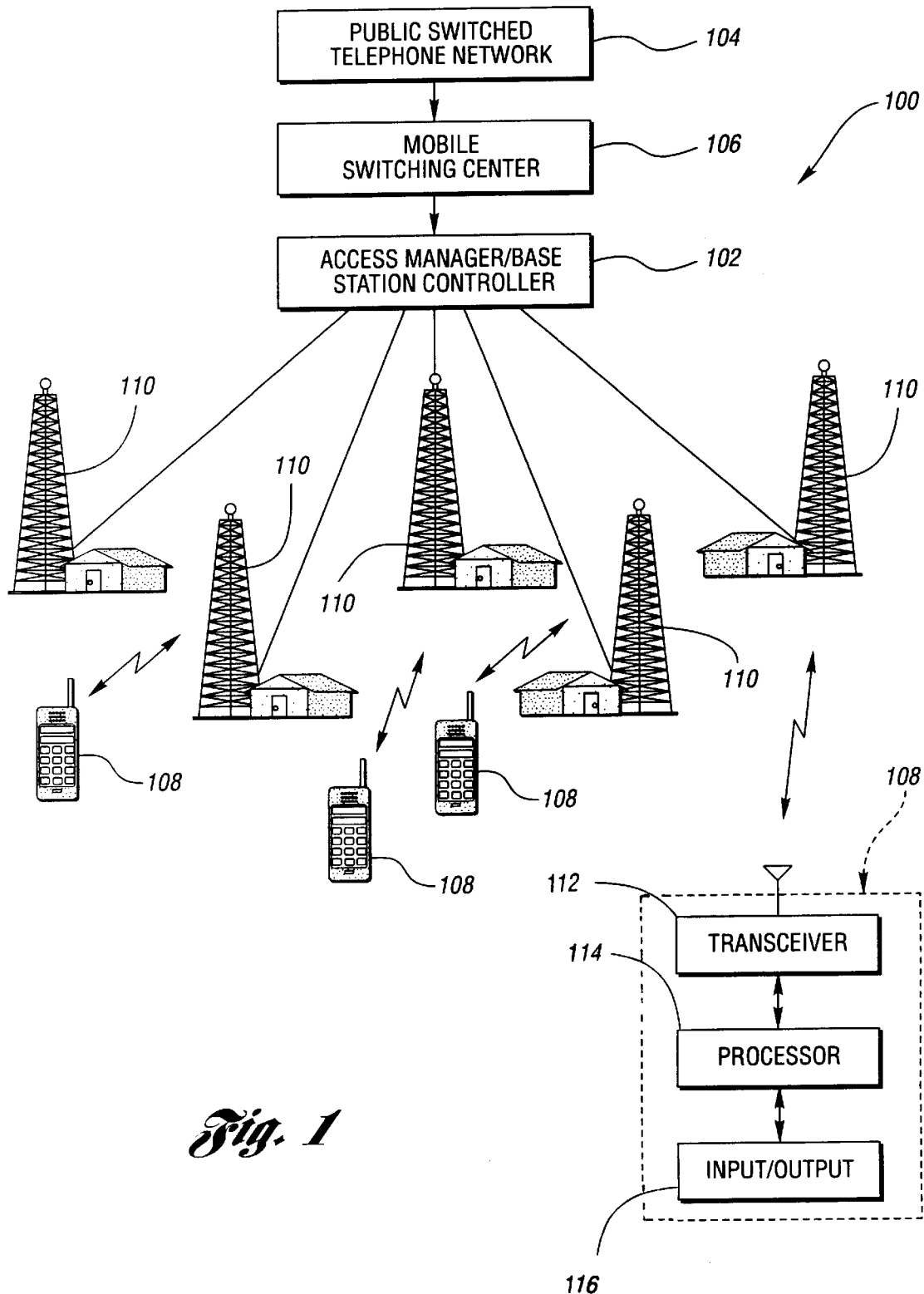
FIG. 1 is an overview of a cellular communications system.

FIG. 1 shows a cellular communications system 100 including an access manager/base station controller 102 having a processor system arranged to control overall cellular call activity. Controller 102 receives calls from and transmits calls to a public switch telephone network 104 via a mobile switching center 106. Further, controller 102 receives calls from and transmits calls to individual mobile users 108 via an appropriate set of base stations 110. Each base station includes an appropriate signal processing system. Also, each mobile user 108 includes a transceiver 112, a processor 114, and an input/output system 116 such as a keypad and speaker. Operation of the respective components of system 100 is well understood to one of ordinary skill in the art.

Figure 2:
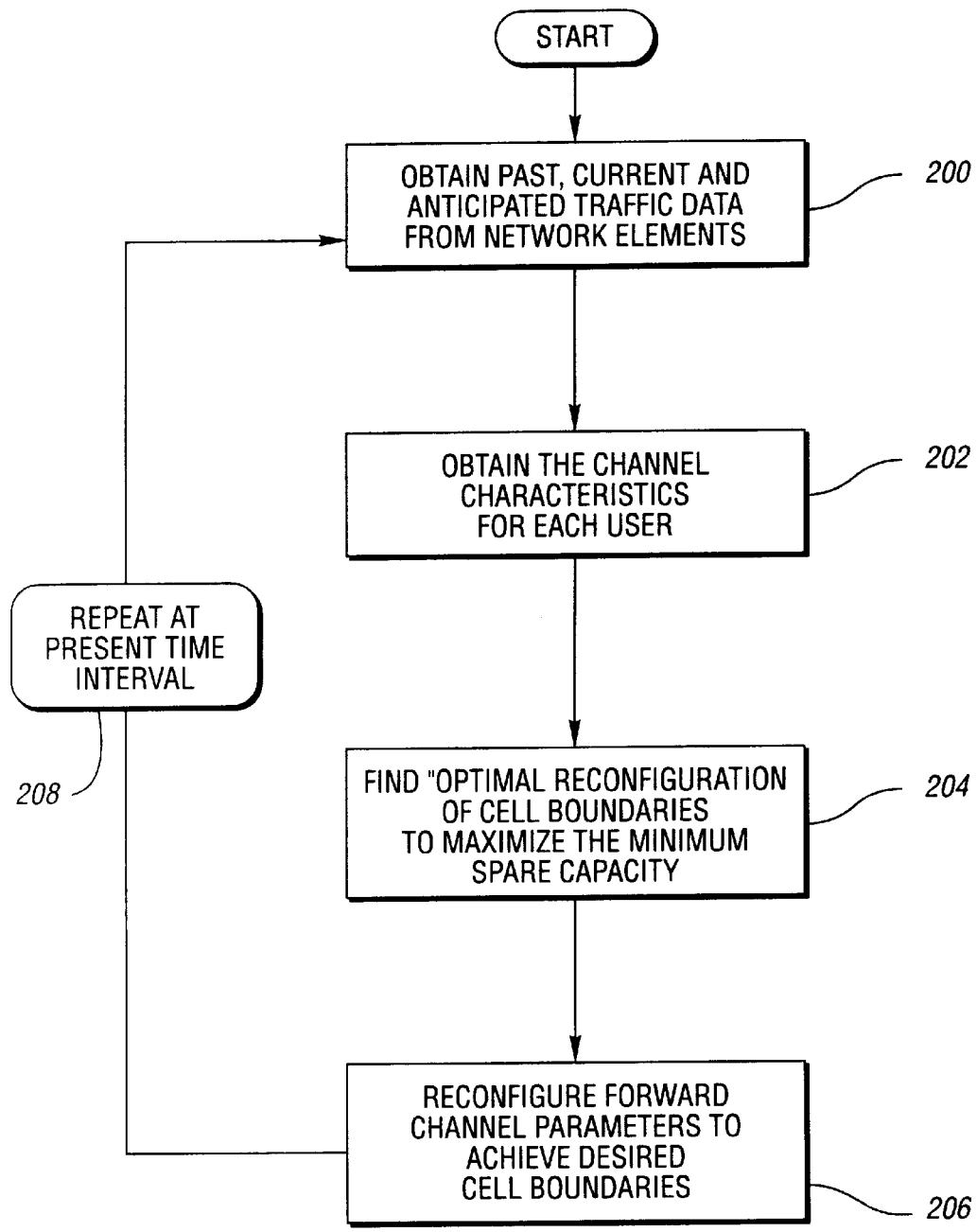
FIG. 2 is a flow chart illustrating optimization of allocated system capacity in accordance with the present invention.

FIG. 2 shows a flow chart illustrating optimization of allocated system capacity in accordance with the present invention. More specifically, past, current, and anticipated data are determined at block 200 by controller 102 based on data received from base stations 110. At block 202, channel characteristics for each user 108 are also calculated based on the information reported by system users routed via the respective base stations to the controller. At block 204 an optimal configuration of cell boundaries is made to maximize a minimum spare channel capacity for each cell. After the optimal configuration is determined, forward channel parameters are reconfigured at block 206 to achieve the desired reconfiguration of cell boundaries. As shown at block 208, this process is preferably repeated at predetermined intervals.

To achieve the above described optimization, the present invention sets system parameters so that the capacity of the CDMA cellular communications system is allocated efficiently at any given time. In particular, call volume or load is spread so as to leave capacity available in all cell sites or sectors. This available capacity is achieved by minimizing a weighted sum of powers received at a group of one or more base stations. As a consequence, the power levels of mobile users or handsets are decreased, thereby reducing interference in the system and supporting additional mobile users without deteriorating system performance.

The programming formulation balances call volume in the system based on either real-time traffic data or anticipated traffic data. Mobile users are assigned to cell sites so as to minimize a weighted sum of powers received at each of a group of base stations. To reserve capacity in a cell site for anticipated future traffic, the received power at the cell site is weighted, resulting in assignment of fewer mobile users to that particular cell site. Rather than instructing individual mobile users to change their current assignments, the present invention provides new assignments by adjusting pilot power strengths and handoff thresholds on a per cell site basis while maintaining contiguous coverage.

Optimization in accordance with the present invention minimizes the weighted sum of powers received at a group of base stations, while accounting for constraints based on real system or hardware limitations. The following description is a summary of the optimization process.

More specifically, minimizing the weighted sum of powers is subject to the following criteria:

If user i is assigned to sector k:
1. Satisfy $E_b/N_o$ constraint for user to be assigned to sector k.
2. Pilot power received from sector k≧pilot power received from any other sector.
3. Pilot power received from sector k≧the minimum power that the handset can detect.

If user i is in softer handoff with sectors k and l:
1. Satisfy $E_b/N_o$ constraint for user i to be in softer handoff between sectors k and l.
2. Pilot power received from sector k≧pilot power received from any other sector except sector l.
3. Pilot power received from sector l≧pilot power received from any other sector except sector k.
4. Pilot powers received from sectors k and l are within the specified handoff thresholds for the user to be in softer handoff.
5. Pilot power received from sector k≧the minimum power that the handset can detect.
6. Pilot power received from sector l≧the minimum power that the handset can detect.

In addition:
1. minimum handset power≦user handset power≦maximum handset power.
2. minimum pilot power≦sector pilot power≦maximum pilot power.
3. minimum handoff threshold≦sector handoff threshold <maximum handoff threshold.

The following notation is required to describe the mathematical formulation.

N=set of mobiles (users)

K=set of sectors or cell sites $N_k$=set of mobiles that can be seen by sector k.

$K_i$=set of sectors that user i can be assigned to. (Corresponds to sectors with $h_{ik} \geq 0$.)

$h_{ik}$ is the attenuation of user's i's signal to sector k. (So $h_{ik}p_i$ is the observed power of user i at sector k, where $p_i$ is the transmitted power of user i.)

$S_i$=set of sector pairs that user i might be assigned to. (If a user is assigned to a sector pair, then user is in soft or softer hand-off.)

σ=receiver noise at the base stations.

$E_k(E_s)$=minimum $E_b/N_o$ requirement at sector k (or sector pair S).

$w_k$=smoothing weight for sector k. This will be determined from historical and anticipated traffic data. The $w_k$'s can be used to reserve capacity for anticipated traffic.

C=the hard capacity of a sector.

P=the power limit for a mobile user.

Q=the pilot power limit for any sector.

λ=the minimum detectable power by a handset.

$a_k(b_k)$=the lower (upper) bound on the base station handoff threshold for sector k.

$\epsilon_k$=the allowable relaxation of the $E_b/N_o$ requirement for a user in soft handoff with sector k.

Outputs (Decision Variables):

$p_i$=transmitted power of user i.

$q_k$=transmitted pilot signal power at sector k.

$x_{ik}$=binary variable indicating whether user i is assigned to sector k.

$x_{is}$=binary variable indicating whether user i is assigned to sector pair S.

$\delta_{ik}$=binary variable indicating whether the active set of user i contains sector k.

$t_k$=the base station handoff threshold for sector k.

The formulation may be written as follows.

Minimize:

$$\sum_{k \in K} w_k \sum_{i \in N} h_{ik} p_i$$

Subject to $$\sum_{k \in K_i} x_{ik} + \sum_{s \in S_i} x_{is} = 1 \quad i \in N, \tag{1}$$

$$x_{ik} = 1 \Rightarrow \tag{2}$$

$$a)\, h_{ik} p_i \geq E_k \left( \sum_{\substack{j \neq i \\ j \in N_k}} h_{jk} p_j + \sigma \right)$$

$$b)\, h_{ik} q_k \geq h_{im} q_m, \, m \neq k, \, m \in K_i,$$

$$c)\, \delta_{ik} = 1,$$

$$d)\, h_{ik} q_k \geq \lambda,$$

$i \in N, k \in K_i.$ $$x_{is} = 1 \Rightarrow \tag{3}$$

$$a)\, (h_{ik} + h_{il}) p_i \geq E_s \left( \sum_{\substack{j \neq i \\ j \in N_k}} h_{jk} p_j + \sum_{\substack{j \neq i \\ j \in N_l}} h_{jl} p_j + \sigma \right)$$

$$b)\, h_{ik} q_k \geq h_{im} q_m, \, m \neq k, l, \, m \in K_i,$$

$$c)\, h_{il} q_l \geq h_{im} q_m, \, m \neq k, l, \, m \in K_i,$$

$$d)\, h_{ik} q_k \geq \min\{t_k, t_l\} h_{il} q_l, \, h_{il} q_l \geq \min\{t_k, t_l\} h_{ik} q_k,$$

$$e)\, \delta_{ik} = 1, \, \delta_{il} = 1$$

$$f)\, h_{ik} q_k \geq \lambda, h_{il} q_l \geq \lambda,$$

$i \in N, s = \{kl\} \in S_i,$
for softer pair $s$.

$$x_{is} = 1 \Rightarrow \tag{4}$$

$$a)\, E_k \left( \sum_{\substack{j \neq i \\ j \in N_k}} h_{jk} p_j + \sigma \right) \geq h_{ik} p_i \geq$$

$$(E_k - \epsilon_k) \left( \sum_{\substack{j \neq i \\ j \in N_k}} h_{jk} p_j + \sigma \right) \text{ and}$$

$$E_l \left( \sum_{\substack{j \neq i \\ j \in N_l}} h_{jl} p_j + \sigma \right) \geq h_{il} p_i \geq$$

$$(E_l - \epsilon_l) \left( \sum_{\substack{j \neq i \\ j \in N_l}} h_{jl} p_j + \sigma \right),$$

$$b)\, h_{ik} q_k \geq h_{im} q_m, \, m \neq k, l, \, m \in K_i,$$

$$c)\, h_{il} q_l \geq h_{im} q_m, \, m \neq k, l, \, m \in K_i,$$

$$d)\, h_{ik} q_k \geq \min\{t_k, t_l\} h_{il} q_l, \, h_{il} q_l \geq \min\{t_k, t_l\} h_{ik} q_k,$$

$$e)\, \delta_{ik} = 1, \, \delta_{il} = 1,$$

$$f)\, h_{ik} q_k \geq \lambda, h_{il} q_l \geq \lambda,$$

$i \in N, s = \{k, l\} \in S_i,$ for softer pair $s$.

$$\sum_{k \in K_i} \delta_{ik} \leq 2, \, i \in N \tag{5}$$

$$\sum_{i \in N} \delta_{ik} \leq C, \, k \in K \tag{6}$$

The formulation minimizes a weighted sum of the received signals at all sectors of a cell site. If all weights are equal, the effect will be to smooth the traffic volume to minimize the total received power. If the weight of one sector is higher, the present invention will attempt to further reduce the total received power at that site, reserving capacity for anticipated future traffic.

Constraint (1) ensures that every user is communicating with exactly one sector or sector pair.

Constraint (2) ensures that an assignment of a user to a single sector satisfies a) the minimum $E_b/N_o$ requirements; b) that the received pilot power from the assigned sector is the highest among all sectors; c) that the sector is part of the users active set; and d) that the pilot power observed by the user is at least the minimum level detectable by the handset.

Constraint (3) is similar to constraint (2). Constraint (3) ensures that a) the minimum $E_b/N_o$ requirements are satisfied accounting for the effects of softer handoff; b-c) that the received pilot power from two sectors comprising the assigned pair are the highest among all sectors; d) both sectors in the pair are in the users active set; e) that both sectors are in the users active set; and f) that the pilot power from the two sectors observed by the user is at least the minimum level detectable by the handset.

Constraint (4) handles the case of soft handoff, where the $E_b/N_o$ requirements a) can be relaxed since the user is constantly moving between the two base stations. Parts b) through f) of constraint (4) are the same as those in constraint (3).

Constraint (5) ensures that each user has no more than 2 sectors in its active set.

Constraint (6) ensures that the hard capacity constraint, that is the number of available channels, is not violated at any sector.

Constraint (7) limits the transmitted power of each user to the maximum power achievable by the handsets.

Constraint (8) limits pilot powers to the maximum possible. In addition, constraint (8) limits minimum possible pilot powers. The minimum pilot power is set so that if every sector is at the minimum pilot power, there will be no coverage holes in the nominal coverage area. More specifically, the minimum pilot power is set so that at every location the received pilot power from at least one sector is greater than $\lambda$, i.e., the minimum power a handset can detect.

Constraint (9) restricts the threshold parameters to be within acceptable limits.

Figure 3:
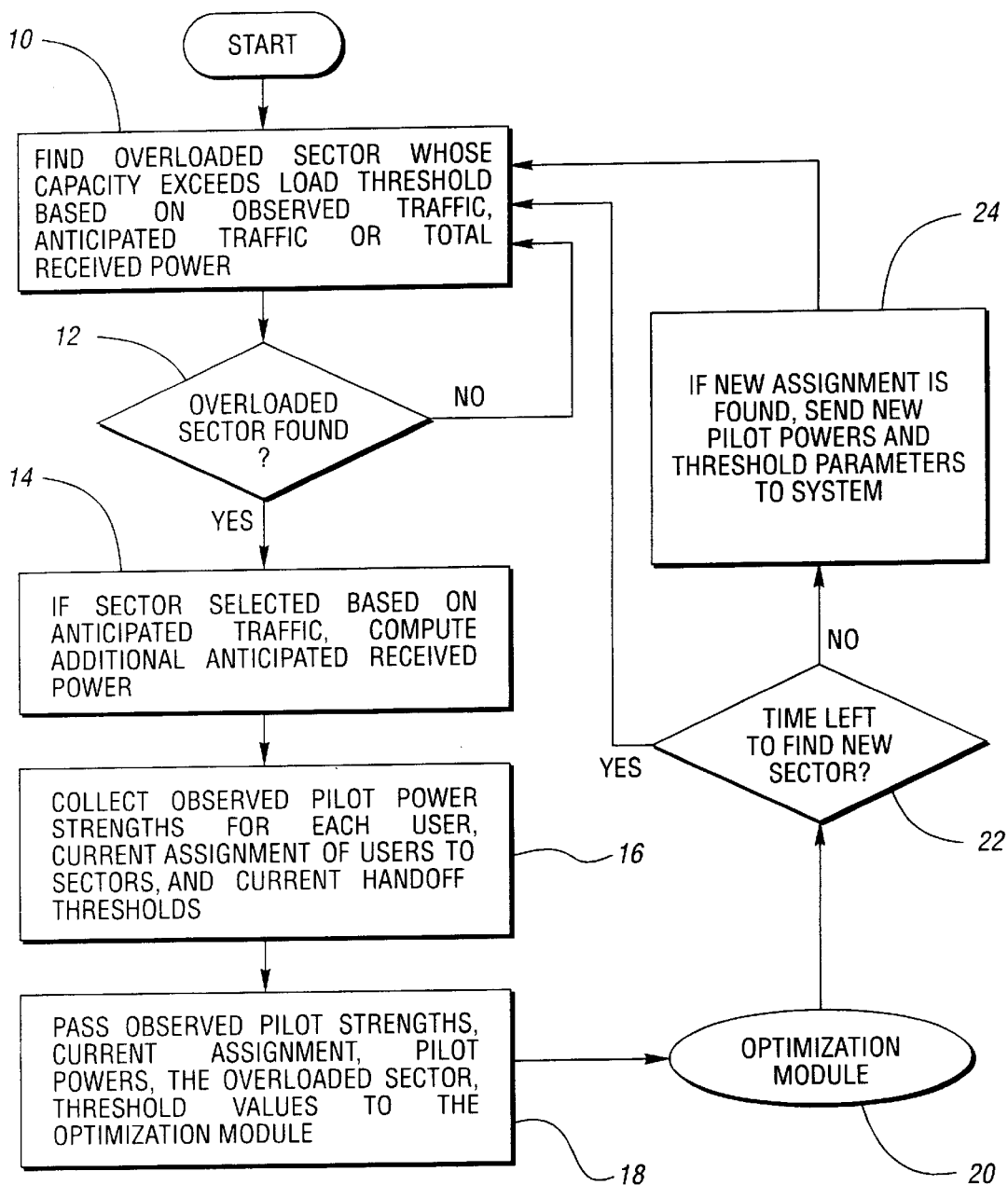
FIG. 3 is a flow chart illustrating the process for optimizing capacity and efficiency of a CDMA cellular communication in accordance with the present invention.

Referring now to FIG. 3, a more detailed description is provided in connection with implementation of the above optimization process. More specifically, the optimization system monitors the cellular system searching for sectors that are overloaded, or that are anticipated to become overloaded during the next update interval as represented by block 10. Decision block 12 determines if an overloaded sector has been located. If an overloaded sector has not been located, then the optimization system continues to search as represented by block 10. If an overloaded sector is located, then the optimization system advances to block 14. If the overloaded sector was selected based on anticipated volume, the additional anticipated received power is computed as represented by block 14.

The observed pilot power strengths for each user are detected, along with the current assignment of users to sectors, current pilot signal strengths, and the current handoff threshold as represented by block 16. This collection of information is then passed to the Optimization Module as illustrated by block 18. The Optimization Module, represented by block 20, calculates a new assignment which moves users out of the overloaded sector, provided that the new assignment reduces the total received power. Requiring that any new assignment improve the objective function prevents the creation of an undesirable overload situation in an adjacent sector. The new assignment will be implemented via a change of pilot power strengths and handoff thresholds. The Optimization Module provides these new pilot power strengths and handoff thresholds.

Decisional block 22 determines if there is time to search for additional overloaded sectors. If time remains available in the current update session, the search for additional overloaded sectors continues as represented by block 10. As represented by block 24, when no time remains, the new pilot powers and new handoff thresholds are returned to the system so that new assignments will be implemented by adjusting pilot powers and handoff thresholds on a per sector basis.

The Optimization Module is tailored to solve the complex optimization problem. When given desired user assignments and handoff thresholds, the optimization problem must accommodate two separate subproblems: (i) ensuring that the desired assignments can meet the $E_b/N_o$ constraints, and (ii) obtaining a feasible setting of pilot powers to achieve the desired assignment. Should either of these subproblems be infeasible, the solution procedures identify which constraint (s) have failed, thereby establishing the cause of infeasibility of an assignment. Therefore, in accordance with the present invention, new assignments are repeatedly tried until a feasible assignment which solves both the $E_b/N_o$ and pilot power subproblems, and lowers the total received power is obtained. The key to such a strategy is effective generation of assignments. This solution strategy allows the use of information from infeasible moves to drive the solution procedure towards feasible solutions with lower total received power.

Figure 4:
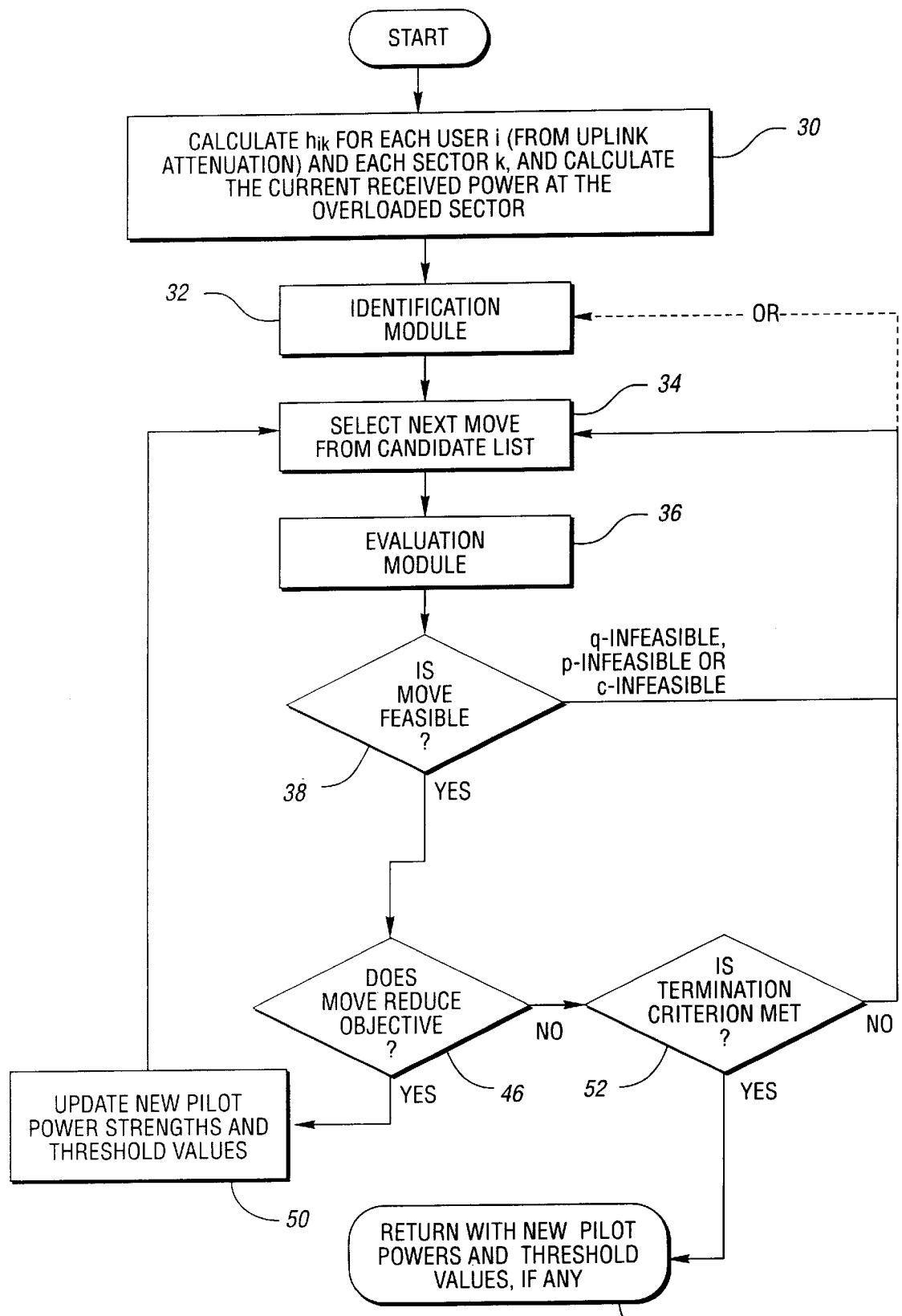
FIG. 4 is a flow chart showing operation in accordance with a first embodiment of the Optimization Module represented in FIG. 3.

FIG. 4 shows the Optimization Module flow chart. The flow chart begins by estimating the uplink attenuations ($h_{ik}$) for each user and each sector as represented by block 30. These are approximated by calculating the downlink attenuation from the pilot power strengths ($q_k$ at sector k) and the strengths observed by the user ($r_{ik}$ observed from sector k by user i). So $$h_{ik}=q_k/r_{ik}.$$

Next, based on the information available, a set of candidate moves are identified by an Identification Module as represented by block 32. A move reassigns a user currently communicating with the overloaded sector to a different sector which is not overloaded. Moves are ordered based on estimated benefit and are sequentially evaluated.

As represented by block 34, the next move is selected from the candidate list. The move is then evaluated by an Evaluation Module as represented by block 36. Decision block 38 receives the result from the Evaluation Module and directs the optimization process accordingly.

If the move is infeasible because the channel capacity (c) is violated, a computed transmitted power of the user (p) exceeds a maximum limit, or a computed transmitted pilot signal power (q) does not fall within an acceptable range of values, the next move is selected from the candidate list as represented by block 34. Alternatively, the information as to why the move was infeasible can be utilized by the identification module to generate a new set of candidate moves at block 32, thereby increasing the probability of finding a feasible move.

On the other hand, if the move evaluated by decision block 36 is feasible, the system advances to decision block 46. Decision block 46 determines whether the move actually achieves the objective of reducing the weighted sum of the powers received at the selected group of base stations. If the move actually achieves the objective, new pilot power strengths and threshold values are updated as represented by block 50 and the system returns to the Identification Module as represented by block 32. If the move does not achieve the objective, the system advances to decision block 52. Decision block 52 determines whether a termination criterion has been met. For example, the termination criterion can be set to be triggered if five moves have been evaluated and no improvement has been achieved. This criterion is flexible and may be revised based on actual system operator experience. If the termination criterion has been met, the system passes the new pilot power strengths and threshold values, if any, to the flow chart shown in FIG. 3 as represented by block 54. If the termination criterion has not been met, the system returns back to select the next move from the candidate list as represented by block 34.

Figure 5:
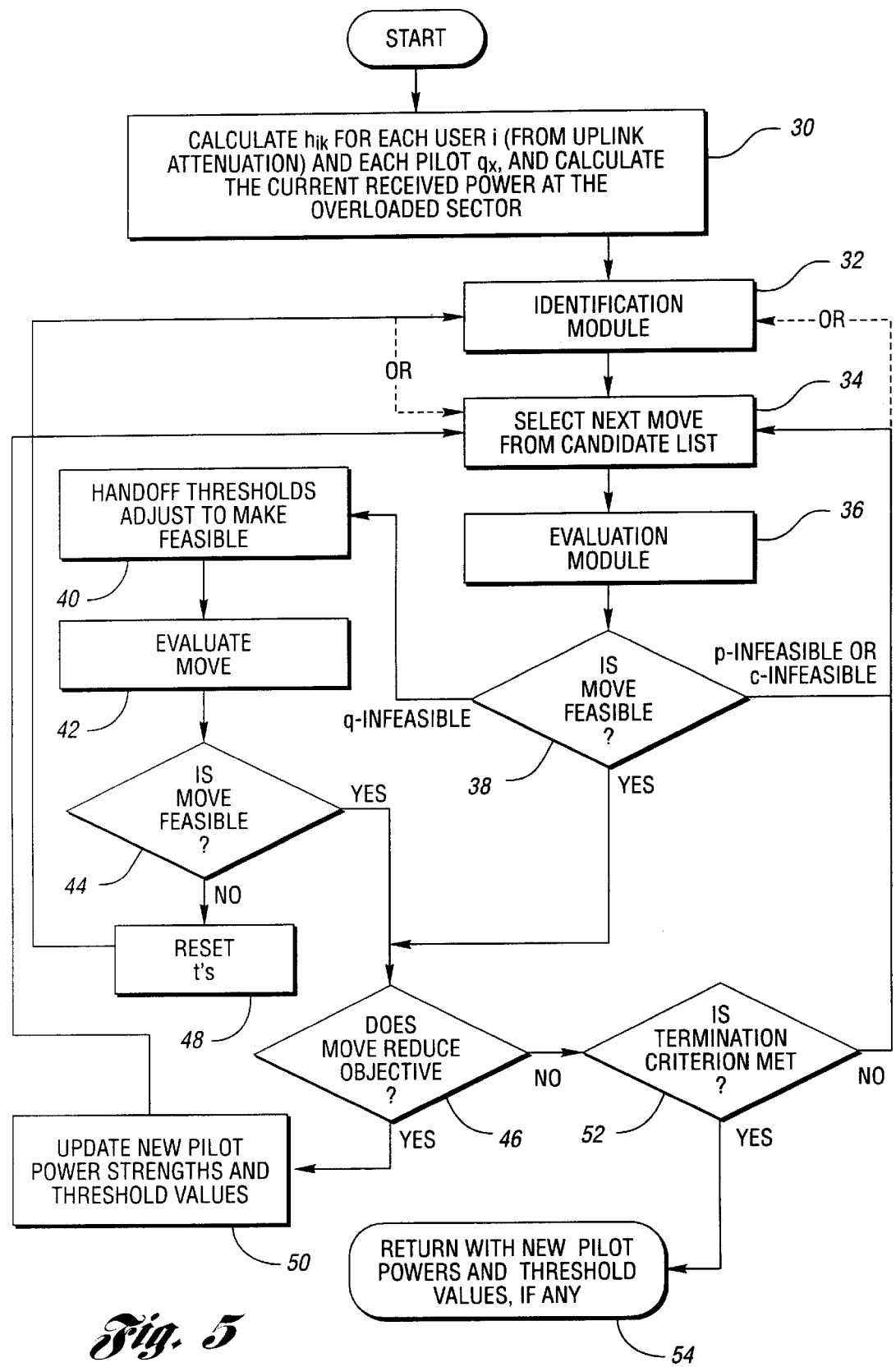
FIG. 5 is a flow chart showing operation in accordance with a second embodiment of the Optimization Module represented in FIG. 3.

Referring now to FIG. 5, an alternative embodiment for the Optimization Module operation is shown, wherein flow chart blocks which are identical to those shown in FIG. 4 have been denoted with like reference numerals. In accordance with this embodiment, at block 38, if a move is determined to be infeasible because a computed transmitted pilot signal power (q) does not fall within an acceptable range of values, the system will advance to a Threshold Module as represented by block 40. The Threshold Module adjusts the handoff thresholds to make the problem feasible. As represented by block 42, the move is then evaluated by the Evaluation Module as discussed in further detail below. Decision block 44 receives the result from block 42 and directs the process accordingly. If the move is feasible, the system will advance to decision block 46. If the move is not feasible, then the system resets the handoff thresholds as represented by block 48 and returns to the Identification Module as represented by block 32, or alternatively to block 34 to select the next move.

Figure 6:
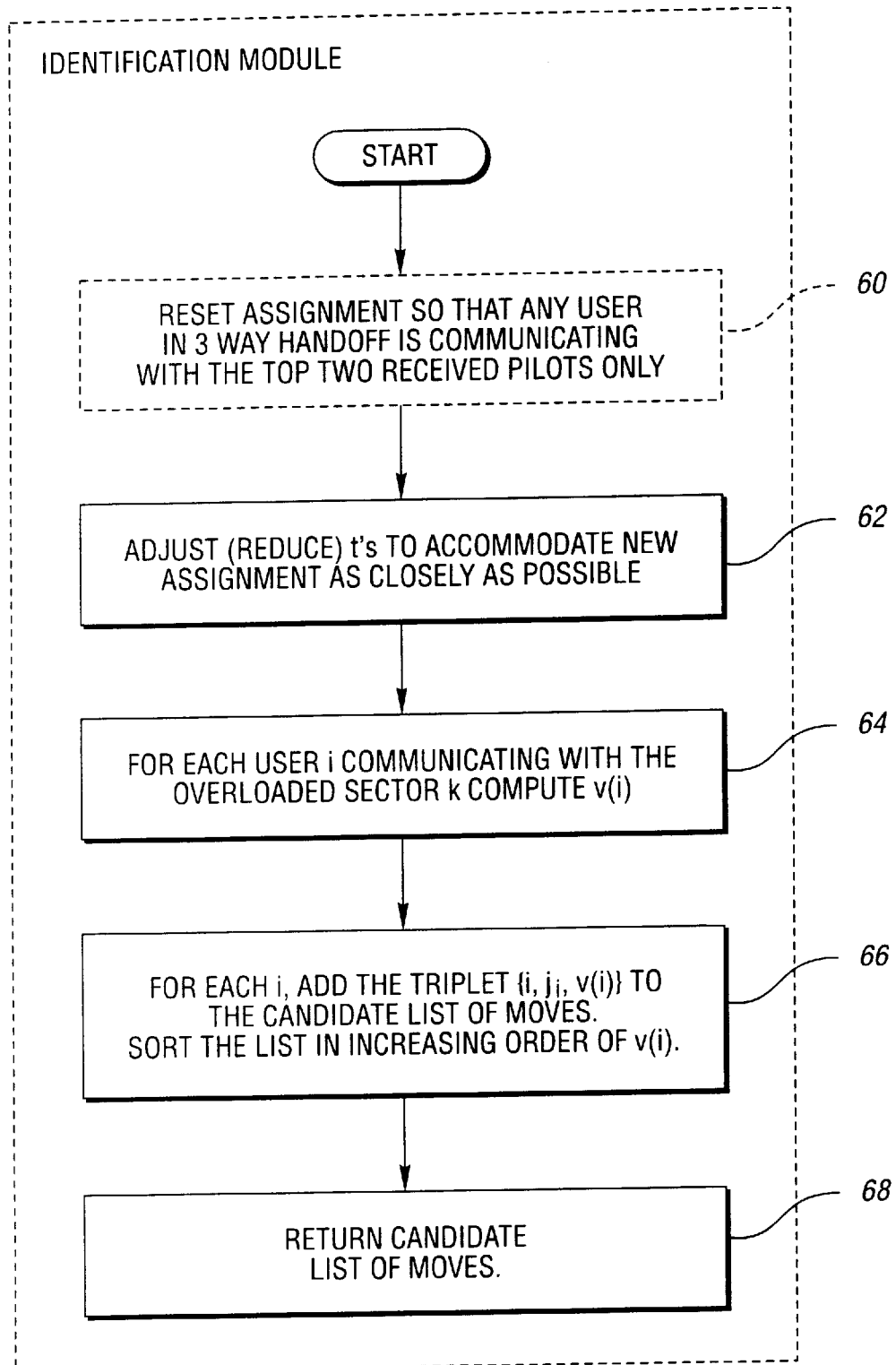
FIG. 6 is a flow chart showing operation of the Identification Module represented in the Optimization Module flow chart of FIGS. 4 and 5.

FIG. 6 shows operation of the Identification Module. For each user i communicating with the overloaded sector k, v(i) which is the estimated objective decrease in received power resulting from moving the user out of sector k is computed. The candidate list of moves is maintained in increasing order of v(i). v(i) is calculated by considering the following types of moves: a user communicating solely with k moving to communicate with another sector l, a user in soft or softer handoff with k and l moving to communicate only with l, and a user in soft or softer handoff with k and l moving to soft or softer handoff with l and m.

Initially, it is noted that because a three-way handoff situation significantly reduces system capacity by requiring additional channels to make the handoff, one embodiment of the present invention includes the Identification Module resetting an assignment so that any user in a three way handoff is communicating only with the top two received pilots as represented by block 60. However, such an arrangement is only one example of how to handle three-way handoff situations, and is not to be construed as limiting. More specifically, instead of forcing all three-way handoffs into two-way handoffs, additional three-way handoff constraints can be implemented similar to two- way handoff constraints, while the potential moves can be expanded to operate in accordance with any such additional constraints.

Next, the handoff thresholds are adjusted to accommodate a new assignment as represented by block 62. For each user i communicating with the overloaded sector k, v(i) is computed as represented by block 64. Let $j_i$ be the corresponding new sector or sector pair. For each i, add triplet $\{i, j_i, v(i)\}$ to the candidate list of moves and sort the list in increasing order of v(i) as represented by block 66. Finally, as represented by block 68, the system returns the candidate list of moves to the Optimization Module shown in FIG. 5.

Figure 7:
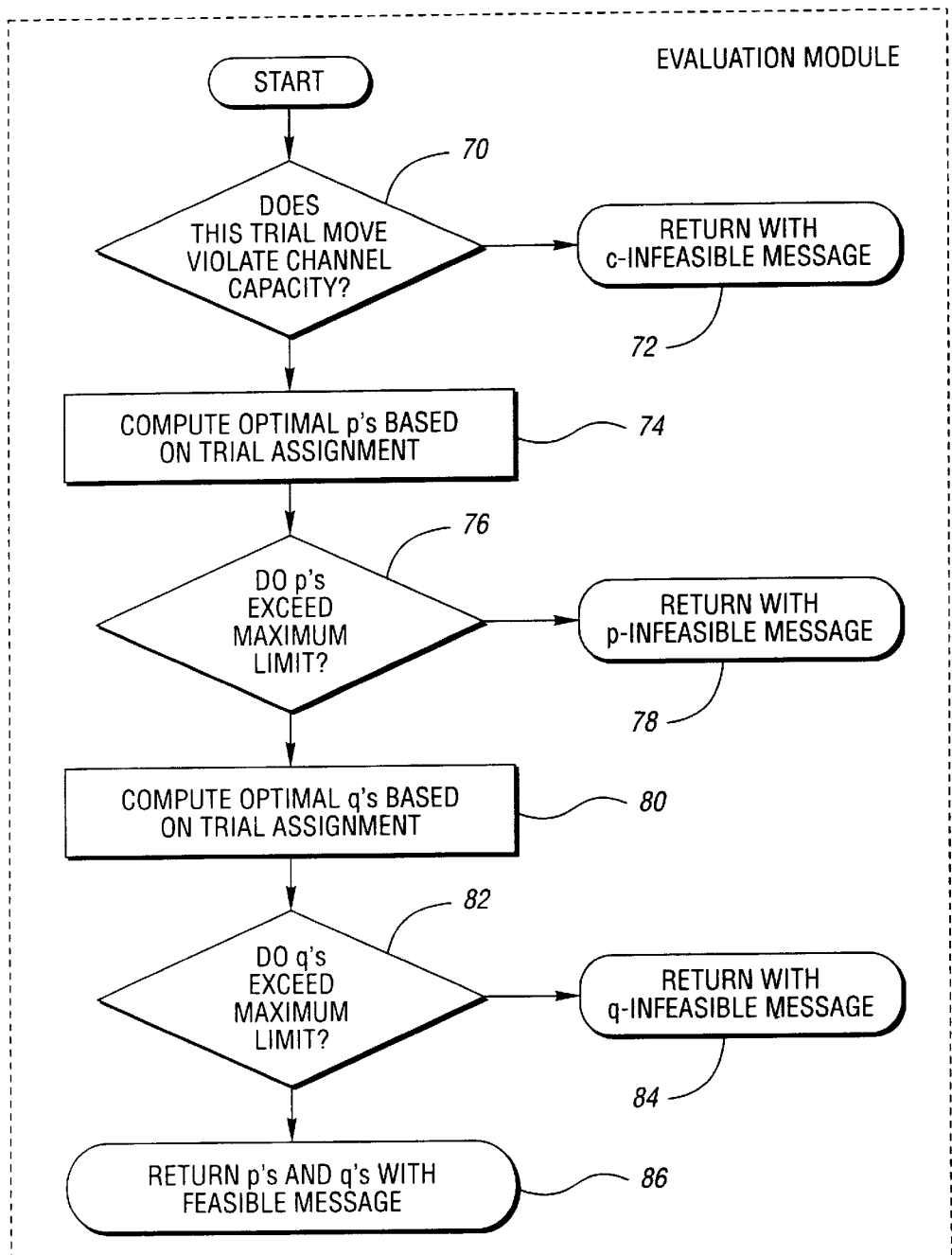
FIG. 7 is a flow chart showing operation of the Evaluation Module represented in the Optimization Module flow chart of FIGS. 4 and 5.

FIG. 7 shows operation of the Evaluation Module. Evaluating a move requires evaluating the resulting reassignment of users to sectors. In order to be "accepted," a move must satisfy four criteria:

1. There must be sufficient channel capacity in all sectors to handle all assigned users.
2. There must be a feasible set of power settings for all users so that all users can meet their $E_b/N_o$ requirements.
3. There must be a way to set all pilot powers and threshold values, so that the users will end up talking to the desired sector(s) (whether in single communication, or in soft or softer handoff) within a standard CDMA system.
4. The resulting assignment must lower the total received power.

The Evaluation Module begins with decision block 70 which determines whether the trial move violates channel capacity. If channel capacity is violated, then a channel capacity (c) infeasible message is returned to the Optimization Module as represented by block 72. Note, when a move is determined to be infeasible, the algorithm uses the reason for infeasibility to identify new candidate moves. If channel capacity is not violated, then the optimal transmitted power of the user (p's), based on the trial move or assignment, is computed as represented by block 74. Next, decision block 76 determines whether the transmitted power of the user exceeds a maximum limit. If the transmitted power exceeds the limit, a transmitted power (p) infeasible message is returned to the Optimization Module as represented by block 78. If the transmitted power does not exceed the limit, the transmitted pilot signal power (q) is computed as represented by block 80. Next, decision block 82 determines whether the transmitted pilot signal power falls within an acceptable range of values. If the transmitted pilot signal power does not fall within said range, then a transmitted pilot signal power infeasible message is returned to the Optimization Module as represented by block 84. If the transmitted pilot signal power falls with the range, the values of the transmitted power of the user and the transmitted pilot signal power are returned to the Optimization Module with a feasible message as represented by block 86.

Figure 8:
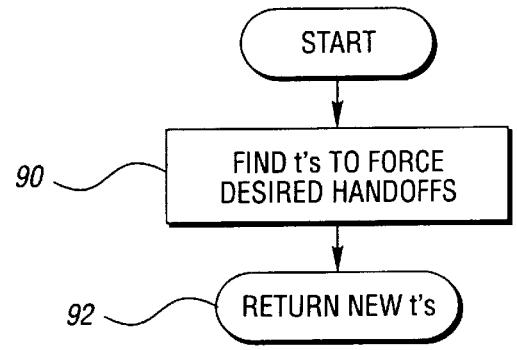
FIG. 8 is a flow chart showing operation of the Threshold Module represented in the Optimization Module flow chart of FIG. 5.

FIG. 8 provides further detail of block 40 of FIG. 5 regarding operation of the Threshold Module. The Threshold Module begins by finding thresholds to force the desired handoffs as represented by block 90. As represented by block 92, the new thresholds are then returned to the system.

It is further noted that with respect to the above described capacity constraint, while the preferred embodiment has been described as imposing such capacity constraint by controlling the number of users, i.e., channels, in a cell sector, capacity constraint could alternatively be imposed by controlling the sum of channels used in each sector (typically three) of a cell to be less than the cell's capacity.

To implement such an alternative arrangement where channel capacity is on a cell wide basis, the following notation is used:

L=set of cells; and

K(l)=sectors in a cell l.

The previously described constraint 6 is then modified as follows:

$$\Sigma k \epsilon K(l) \Sigma i \epsilon N \delta_{ik} \leq C, \, l \epsilon L \qquad (6\text{alt.})$$

All subsequent operation of the alternative embodiment would then use this modified channel capacity constraint in the optimization process.

It is to be understood, of course, that while the forms of the invention described above constitute the best mode contemplated of practicing the present invention, the preceding description is not intended to illustrate all possible forms thereof. It is also to be understood that the words used are words of description, rather than of limitation, and that various changes may be made without departing from the spirit and scope of the present invention, which should be construed according to the following claims.

What is claimed is:

1. In a cellular communication system having a plurality of cell sites, and where mobile users transmit and receive signals using code division multiple access (CDMA), a method for optimizing cell site call volume capacity comprising the steps of:

obtaining a current call volume for each of the plurality of cell sites based on all current active mobile users within the system;

estimating effective boundaries for each of the plurality of cell sites that minimizes a weighted sum of powers received by a grouping of the plurality of cell sites based on the current call volume call so as to leave available call capacity in each of the plurality of cell sites; and controlling system parameters so as to effect the estimated cell site boundaries.

2. The method of claim 1 wherein the step of obtaining a current call volume further comprises the step of:

determining if any of the plurality of cell sites has a current or anticipated call volume exceeding a predetermined volume threshold.

3. The method of claim 1 wherein the step of estimating boundaries for each of the plurality of cell sites further comprises the steps of:

determining an optimal boundary reconfiguration for each cell site so as to distribute the total call volume within the system evenly among the grouping of cell sites.

4. The method of claim 3 wherein the step of determining optimal boundary reconfiguration further comprises the steps of:

calculating a trial move for each mobile user communicating with a cell site experiencing an overload of call volume; and evaluating each trial move to estimate a probable effect on call volume of the overloaded cell site.

5. The method of claim 4 wherein the step of evaluating each trial move further comprises the steps of:

determining that the trial move will not violate channel capacity;

calculating a new optimal user power based on the trial move;

determining that the new optimal user power does not exceed a predetermined maximum limit;

calculating a new optimal pilot power based on the trial move; and determining that the new optimal pilot power falls with a predetermined range of values.

6. The method of claim 4 wherein the step of evaluating each trial move includes:

determining whether the trial move will violate channel capacity.

7. The method of claim 6 further comprising the steps of determining a cause for the channel capacity violation, and calculating a new trial move based on the determined cause.

8. The method of claim 7 wherein the step of evaluating each trial move further includes:

calculating a new optimal user power based upon the trial move provided the trial move does not violate channel capacity.

9. The method of claim 8 wherein the step of evaluating each trial move further includes:

determining whether the new optimal user power exceeds a predetermined maximum limit.

10. The method of claim 9 wherein the step of evaluating each trial move further includes:

calculating a new optimal pilot power based on the trial move provided that new optimal user power does not exceed the predetermined maximum limit.

11. The method of claim 10 wherein the step of evaluating each trial move further includes:

determining whether the new optimal pilot power falls with a predetermined range of values.

12. The method of claim 1 wherein the step of controlling system parameters further comprises adjusting pilot power.

13. The method of claim 1 further comprising the step of providing nominal contiguous coverage by setting a minimum pilot power threshold limit applicable to all cells.

14. The method of claim 1 wherein the step of estimating boundaries for each of the plurality of cell sites is based on a capacity constraint of controlling the number of users allowed in a cell sector.

15. The method of claim 1 wherein the step of estimating boundaries for each of the plurality of cell sites is based on a capacity constraint of controlling the sum of channels which can be used in cell.

16. In a CDMA cellular communication system having a plurality of cell sites, and where mobile users transmit and receive signals using code division multiple access (CDMA), a system for optimizing cell site call volume capacity comprising:

a base station controller in communication with each of said plurality of base stations for obtaining a current call volume for each of the plurality of cell sites based on all current active mobile users within the system, said base station controller comprising a processing subsystem programmed to estimate effective boundaries for each of the plurality of cell sites that minimizes a weighted sum of powers received by a grouping of the plurality of cell sites based on the current call volume so as to leave available call capacity in each of the plurality of cell sites, and a control system for controlling system parameters so as to effect the estimated cell site boundaries.

17. The system of claim 16 wherein the processing subsystem is further programmed to obtain a current call volume by determining if any of the plurality of cell sites has a current or anticipated call volume exceeding a predetermined volume threshold.

18. The system of claim 16 wherein the processing subsystem is programmed to estimate boundaries for each of the plurality of cell sites by determining an optimal boundary reconfiguration for each cell site so as to distribute the total call volume within the system evenly among the grouping of cell sites.

19. The system of claim 18 wherein the processing subsystem is further programmed to calculate a trial move for each mobile user communicating with a cell site experiencing an overload of call volume, and evaluating each trial move to estimate a probable effect on call volume of the overloaded cell site.

20. The system of claim 19 wherein the processing subsystem comprises a program for evaluating each trial move by:

determining that the trial move will not violate channel capacity;

calculating a new optimal user power based on the trial move;

determining that the new optimal user power does not exceed a predetermined maximum limit; and determining that the new optimal pilot power falls with a predetermined range of values.

21. The system of claim 19 wherein the processing subsystem comprises a program for evaluating each trial move by determining whether the trial move will violate channel capacity.

22. In a code division multiple access (CDMA) cellular communication system having a plurality of cell sites, a method for optimizing cell site call volume capacity comprising the steps of:

obtaining a current call volume for each of the plurality of cell sites;

estimating effective boundaries for each of the plurality of cell sites that minimizes a weighted sum of powers received by a grouping of the plurality of cell sites based on the current call volume call so as to leave available call capacity in each of the plurality of cell sites, further including estimating a path loss from a base station to each individual active mobile unit; and controlling pilot power settings to effect the estimated cell site boundaries.

* * * * *